US008909599B2

(12) United States Patent
Khaladkar et al.

(10) Patent No.: US 8,909,599 B2
(45) Date of Patent: Dec. 9, 2014

(54) EFFICIENT MIGRATION OF BINARY XML ACROSS DATABASES (75) Inventors: Bhushan Khaladkar, Mountain View, CA (US); Nipun Agarwal, Santa Clara, CA (US); Asha Tarachandani, Newark, CA (US); Sivansankaran Chandrasekar, Palo Alto, CA (US); Sabina Petride, Bucharest (RO)

(73) Assignee: Oracle International Corporation, Redwood Shores ( * ) Notice: Subject to any disclaimer, the term of this patent is extended or adjusted under 35 U.S.C. 154(b) by 843 days.

(21) Appl. No.: 11/601,116

(22) Filed: Nov. 16, 2006

(65) Prior Publication Data
US 2008/0120351 A1 May 22, 2008

(51) Int. Cl.
G06F 17/30 (2006.01)
(52) U.S. Cl.
CPC .................. G06F 17/30908 (2013.01)
USPC .......................... 707/610; 707/796
(58) Field of Classification Search
None
See application file for complete search history.

(56) References Cited

U.S. PATENT DOCUMENTS

| 4,930,071 A | 5/1990 | Tou et al. |
| 5,222,235 A | 6/1993 | Hintz et al. |
| 5,278,978 A | 1/1994 | Demers et al. |
| 5,396,623 A | 3/1995 | McCall et al. |
| 5,454,101 A | 9/1995 | Mackay et al. |
| 5,551,020 A | 8/1996 | Flax et al. |
| 5,579,516 A | 11/1996 | Van Maren et al. |
| 5,687,343 A | 11/1997 | Fecteau et al. |
| 5,692,174 A | 11/1997 | Bireley et al. |
| 5,758,345 A | 5/1998 | Wang |
| 5,781,911 A | 7/1998 | Young et al. |
| 5,787,445 A | 7/1998 | Daberko |
| 5,787,446 A | 7/1998 | Dang et al. |
| 5,819,298 A | 10/1998 | Wong et al. |
| 5,864,853 A | 1/1999 | Kimura et al. |
| 5,870,746 A | 2/1999 | Knutson et al. |
| 5,890,167 A | 3/1999 | Bridge, Jr. et al. |

(Continued)

FOREIGN PATENT DOCUMENTS

| EP | 0 942 363 A2 | 9/1999 |
| EP | 0 992 909 A2 | 4/2000 |

(Continued)

OTHER PUBLICATIONS

Bayardo et al. "An Evaluation of Binary XML Encoding Optimizations for Fast Stream Based XML Processing", May 17-22, 2004, Proceedings of the 13$^{th}$ International Conference on the World Wide Web pp. 345-354.*

(Continued)

Primary Examiner — Christyann Pulliam
Assistant Examiner — Charles Adams
(74) Attorney, Agent, or Firm — Hickman Palermo Troung Becker et all LLP (57) ABSTRACT Techniques are provided for transporting subset of databases containing binary XML data. In one embodiment, a method is provided that allows transporting binary XML data that conforms to schema by also transporting the schema entries that are necessary to derive the binary XML. In another embodiment, a method is provided that allows transporting binary XML data that does not conform to schema by also transporting the token tables that contain the mapping for the binary XML.

10 Claims, 5 Drawing Sheets (56) References Cited

U.S. PATENT DOCUMENTS

| | | | |
|---|---|---|---|
| 5,890,169 A | 3/1999 | Wong et al. | |
| 5,924,097 A | 7/1999 | Hill et al. | |
| 5,937,408 A | 8/1999 | Shoup et al. | |
| 5,943,677 A | 8/1999 | Hicks | |
| 5,944,818 A | 8/1999 | Baxter et al. | |
| 5,951,694 A | 9/1999 | Choquier et al. | |
| 5,970,502 A | 10/1999 | Salkewicz et al. | |
| 5,991,753 A | 11/1999 | Wilde | |
| 6,014,614 A | 1/2000 | Herring et al. | |
| 6,014,670 A | 1/2000 | Zamanian et al. | |
| 6,032,158 A | 2/2000 | Mukhopadhyay et al. | |
| 6,035,379 A | 3/2000 | Raju et al. | |
| 6,035,412 A | 3/2000 | Tamer et al. | |
| 6,041,357 A | 3/2000 | Kunzelman et al. | |
| 6,044,374 A | 3/2000 | Nesamoney et al. | |
| 6,044,378 A | 3/2000 | Gladney | |
| 6,088,728 A | 7/2000 | Bellemore et al. | |
| 6,098,076 A | 8/2000 | Rekieta et al. | |
| 6,101,497 A | 8/2000 | Ofek | |
| 6,108,657 A | 8/2000 | Shoup et al. | |
| 6,108,748 A | 8/2000 | Ofek et al. | |
| 6,122,636 A | 9/2000 | Malloy et al. | |
| 6,151,601 A | 11/2000 | Papierniak et al. | |
| 6,151,608 A | 11/2000 | Abrams | |
| 6,208,990 B1 | 3/2001 | Suresh et al. | |
| 6,222,840 B1 | 4/2001 | Walker et al. | |
| 6,233,537 B1 | 5/2001 | Gryphon et al. | |
| 6,249,786 B1 | 6/2001 | Wadewitz | |
| 6,272,503 B1 | 8/2001 | Bridge, Jr. et al. | |
| 6,339,775 B1 | 1/2002 | Zamanian et al. | |
| 6,414,610 B1 | 7/2002 | Smith | |
| 6,434,558 B1 | 8/2002 | MacLeod et al. | |
| 6,442,568 B1 | 8/2002 | Velasco et al. | |
| 6,442,663 B1 | 8/2002 | Sun et al. | |
| 6,442,748 B1 | 8/2002 | Bowman-Amuah | |
| 6,453,038 B1 | 9/2002 | McFarlane et al. | |
| 6,484,179 B1 | 11/2002 | Roccaforte | |
| 6,490,590 B1 | 12/2002 | Fink | |
| 6,604,104 B1 | 8/2003 | Smith | |
| 6,604,110 B1 | 8/2003 | Savage et al. | |
| 6,611,838 B1 | 8/2003 | Ignat et al. | |
| 6,643,652 B2 | 11/2003 | Hegeson et al. | |
| 6,691,155 B2 | 2/2004 | Gottfried | |
| 6,694,306 B1 | 2/2004 | Nishizawa et al. | |
| 6,694,505 B1 | 2/2004 | Tan | |
| 6,757,689 B2 | 6/2004 | Battas et al. | |
| 6,785,673 B1 | 8/2004 | Fernandez et al. | |
| 6,792,431 B2 | 9/2004 | Tamboli et al. | |
| 6,839,724 B2 | 1/2005 | Manchanda et al. | |
| 6,883,137 B1 | 4/2005 | Girardot et al. | |
| 6,978,282 B1 | 12/2005 | Dings et al. | |
| 6,993,657 B1 | 1/2006 | Renner et al. | |
| 6,996,566 B1 | 2/2006 | George et al. | |
| 7,013,425 B2 | 3/2006 | Kataoka | |
| 7,058,958 B1 | 6/2006 | Shutt et al. | |
| 7,072,896 B2 | 7/2006 | Lee et al. | |
| 7,441,185 B2* | 10/2008 | Coulson et al. | 715/234 |
| 7,487,168 B2 | 2/2009 | Rys et al. | |
| 2001/0047270 A1 | 11/2001 | Gusick et al. | |
| 2002/0073019 A1 | 6/2002 | Deaton | |
| 2002/0073139 A1 | 6/2002 | Hawkins et al. | |
| 2002/0091702 A1 | 7/2002 | Mullins | |
| 2002/0116457 A1 | 8/2002 | Eshleman et al. | |
| 2002/0143733 A1 | 10/2002 | Mukkamalla et al. | |
| 2002/0156796 A1 | 10/2002 | Hisamatsu et al. | |
| 2002/0161896 A1 | 10/2002 | Wen et al. | |
| 2002/0169745 A1 | 11/2002 | Hotti et al. | |
| 2003/0005028 A1 | 1/2003 | Dritschler et al. | |
| 2003/0014523 A1 | 1/2003 | Teloh et al. | |
| 2003/0093626 A1 | 5/2003 | Fister | |
| 2003/0140055 A1 | 7/2003 | Doney et al. | |
| 2003/0172158 A1 | 9/2003 | Pillai et al. | |
| 2003/0208505 A1 | 11/2003 | Mullins et al. | |
| 2003/0212789 A1 | 11/2003 | Hamel et al. | |
| 2003/0227392 A1* | 12/2003 | Ebert et al. | 340/825.49 |
| 2003/0236834 A1 | 12/2003 | Gottfried | |
| 2004/0024979 A1 | 2/2004 | Kaminsky et al. | |
| 2004/0034669 A1 | 2/2004 | Smith et al. | |
| 2004/0064487 A1 | 4/2004 | Nguyen et al. | |
| 2004/0068509 A1* | 4/2004 | Garden et al. | 707/100 |
| 2004/0068696 A1* | 4/2004 | Seyrat et al. | 715/513 |
| 2004/0073567 A1 | 4/2004 | Pelon | |
| 2004/0088297 A1 | 5/2004 | Coates et al. | |
| 2004/0091114 A1 | 5/2004 | Carter et al. | |
| 2004/0143791 A1* | 7/2004 | Ito et al. | 715/513 |
| 2004/0153459 A1 | 8/2004 | Whitten et al. | |
| 2004/0182225 A1 | 9/2004 | Ellis et al. | |
| 2004/0268305 A1* | 12/2004 | Hogg et al. | 717/109 |
| 2005/0015386 A1 | 1/2005 | Mortensen et al. | |
| 2005/0038831 A1* | 2/2005 | Souder et al. | 707/201 |
| 2005/0050054 A1 | 3/2005 | Clark et al. | |
| 2005/0256908 A1 | 11/2005 | Yang et al. | |
| 2005/0278289 A1* | 12/2005 | Gauweiler et al. | 707/1 |
| 2005/0278616 A1* | 12/2005 | Eller | 715/513 |
| 2006/0036657 A1* | 2/2006 | Cheslow | 707/204 |
| 2006/0168513 A1* | 7/2006 | Coulson et al. | 715/513 |
| 2006/0277179 A1 | 12/2006 | Bailey | |
| 2007/0044012 A1* | 2/2007 | Suver et al. | 715/513 |
| 2007/0094286 A1 | 4/2007 | Murthy et al. | |
| 2007/0129953 A1 | 6/2007 | Cunningham et al. | |
| 2007/0179947 A1 | 8/2007 | Ahmed et al. | |
| 2007/0219951 A1 | 9/2007 | Ahmed et al. | |
| 2007/0219952 A1 | 9/2007 | Ahmed et al. | |
| 2007/0219969 A1 | 9/2007 | Su et al. | |
| 2007/0219977 A1 | 9/2007 | Su et al. | |
| 2008/0065978 A1* | 3/2008 | Francker et al. | 715/223 |
| 2008/0077606 A1* | 3/2008 | Fang et al. | 707/101 |

FOREIGN PATENT DOCUMENTS

| | | |
|---|---|---|
| EP | 1 170 662 A2 | 1/2002 |
| WO | WO 02/05116 A2 | 1/2002 |
| WO | WO 02/07037 A1 | 1/2002 |
| WO | WO 02/097676 A2 | 12/2002 |
| WO | WO 03/014928 A2 | 2/2003 |
| WO | WO 03/062983 A2 | 7/2003 |

OTHER PUBLICATIONS

Claus Hagen, et al., "Highly Available Process Support Systems: Implementing Backup Mechanisms," 1999, IEEE, pp. 112-121.

IBM Corp., "Conditional Container Reuse for Database and Tablespace Restore," IBM Technical Disclosure Bulletin, vol. 39, No. 12, Dec. 1996, XP-002240529, pp. 199-200.

R. W. Dey, et al., IBM Corp., "Data Space Manager," IBM Technical Disclosure Bulletin, vol. 25, No. 11A, Apr. 1983, XP-000714243, pp. 5456-5459.

Oracle Corporation, "Oracle9i Application Server: Business Intelligence Technical Overview," Jun. 2003, An Oracle White Paper, http://otn.oracle.com/products/bi/pdf/bi_overview.pdf, pp. 1-13.

Oracle Corporation, "ETL Processing with Oracle9i," Jun. 2001, An Oracle White Paper, http://otn.oracle.com/products/bi/pdf/bi_overview.pdf, pp. 1-18.

Oracle Corporation, "Oracle9i for e-Business: Business Intelligence," Jun. 2001, An Oracle Technical White Paper, http://otn.oracle.com/products/oracle9i/pdf/o9i_bi_twp.pdf, pp. 1-18.

Oracle Corporation. "Oracle 9i Warehouse Builder, Architectural White paper" Jan. 2003, http://otn.oracle.com/products/warehouse/pdf/OWB_Architecture_WhitePaper.pdf, pp. 1-16.

International Searching Authority, "Notification of Transmittal of the International Search Report or the Declaration," PCT/US03/23747, dated May 25, 2004, 6 pages.

Kei Kurakawa et al., "Life Cycle Design Support Based on Environmental Information Sharing," IEEE, Feb. 1-3, 1999, Proceedings EcoDesign '99, First International Symposium, pp. 138-142.

Oliver Gunther, et al., "MMM: A Web-Based System for Sharing Statistical Computing Modules," IEEE, May-Jun. 1997, vol. 1, Issue 3, pp. 59-68.

Oracle Corporation, "Advanced Analytic Services," 1996-2001, Oracle9i Warehousing Guide, Release 1 (9.0.1), Part No. A90237-01,

(56) References Cited

OTHER PUBLICATIONS http://download-west.oracle.com/docs/cd/A91202_01/901_doc/server.901/a90237, data retrieved Aug. 6, 2004, pp. 1-5.

Oracle Corporation, "Transforming Tables into Multidimensional Data Structures," 1996-2001, Oracle9i OLAP Services Concepts and Administration Guide, Release 1 (9.0.1), Part No. A88755-01, http://download-west.oracle.com/docs/cd/A91202_01/901_doc/olap.901/a88755/, data retrieved Aug. 6, 2004, pp. 1-3.

Oracle Corporation, "Understanding the OLAP API," 1996-2001, Oracle9i OLAP Services Concepts and Administration Guide, Release 1 (9.0.1), Part No. A88755-01, http://download-west.oracle.com/docs/cd/A91202_01/901_doc/olap.901/a88755/, data retrieved Aug. 6, 2004, pp. 1-3.

Oracle Corporation, "Controlling the Flow of Execution," 1996-2001, Oracle9i OLAP Services Developer's Guide to the OLAP DML, Release 1 (9.0.1), Part No. A86720-01, http://download-west.oracle.com/docs/cd/A91202_01/901_doc/olap.901/a86720/, data retrieved Aug. 6, 2004, pp. 1-4.

International Searching Authority, "Notification of Transmittal of the International Search Report and the Written Opinion of the International Searching Authority, or the Declaration," PCT/US04/025805, dated Dec. 3, 2004, 12 pages.

International Preliminary Examining Authority, "Notification of Transmittal of International Preliminary Report on Patentability," PCT/US2004/025805, dated Nov. 18, 2005, 16 pages.

Spalding Office Systems, "DocuWare Document Server Specifications," Sep. 2, 2003, http://web.archive.org/web/20030902215629/http://spaldingoffice.com/includes/static-documents/site/docuData/docserverspec.htm/, retrieved on Feb. 6, 2007, 2 pages.

Microsoft Corporation, Migrating your Access Database to Microsoft SQL Server 7.0, Feb. 1999, http://msdn2.microsoft.com/en-us/library/aa226083(sql.70).aspx, retrieved on Feb. 6, 2007, 8 pages.

Naude, Frank, "Oracle FAQ: Glossary of Terms," Feb. 28, 2001, http://web.archive.org/web/20010228061218/http://www.orafaq.com/glossary/faqlosr.htm, retrieved on Feb. 6, 2007, 3 pages.

Software Resource International, "Application Migration Services," Aug. 5, 2002, http://www.softresint.com/pub/SPD/01-04-012.pdf, 2 pages.

Swierk, Edward et al., "The Roma Personal Metadata Service," Oct. 2001, http://.hpl.hp.com/personal/Mary_Baker/publications/ROMA-WMCSA2000.pdf, pp. 1-10.

R. Hugo Patterson et al., "Informed Prefetching and Caching," ACM 1995, pp. 79-95.

S. G. Shiva, et al., "Modular Description/Simulation/Synthesis Using DDL," 19$^{th}$ Design Automation Conference 1982, IEEE Press, pp. 321-329.

Israel Spiegler, "Automating Database Construction," ACM SIGMIS Database, vol. 14, Issue 3, Spring 1983, pp. 21-29.

"Optimizing Development Productivity Using UML in Oracle9iJ Developer," Oracle, Dec. 2001, 21 pages.

"UML Distilled Applying the Standard Object Modeling Language,", Martin Fowler et al., 1997, whole book.

"Object-Oriented Modeling and Design," James Rumbaugh et al., Nov. 14, 1990, pp. 366-396.

Jeffrey S. Chase, et al., "Dynamic Virtual Clusters in a Grid Site Manager," Proceedings of the 12$^{th}$ IEEE International Symposium on High Performance Distributed Computing (HPDC '03), 2002, IEEE, pp. 90-100.

Henry Song, et al., "Browser State Repository Service," Lecture Notes in Computer Science, vol. 2414, 2002, pp. 1-14, XP002904339.

Eric Skow, et al., "A Security Architecture for Application Session Handoff," 2002, IEEE International Conference Proceedings, Apr. 28-May 2, 2002, vol. 1 of 5, pp. 2058-2063, XP010589848.

International Searching Authority, "Notification of Transmittal of the International Search Report and the Written Opinion of the International Searching Authority, or the Declaration," PCT/US2004/026405, dated Jan. 6, 2006, 13 pages.

International Searching Authority, "Notification of Transmittal of the International Search Report and the Written Opinion of the International Searching Authority, or the Declaration," PCT/US2004/026389, dated Aug. 4, 2005, 13 pages.

European Patent Office, "International Preliminary Report on Patentability," Aug. 26, 2005, PCT/US2004/026570, dated Aug. 26, 2005, 9 pages.

International Searching Authority, "Notification of Transmittal of the International Search Report and the Written Opinion of the International Searching Authority, or the Declaration," PCT/US2004,026445, dated Aug. 25, 2005, 12 pages.

\* cited by examiner

FIG. 1
MOVING TABLESPACES WITH KNOWN-SCHEMA XML

FIG. 2
MOVING TABLESPACES WITH UNKNOWN-SCHEMA XML

FIG. 3
DATABASE WITH TWO SET OF TOKEN TABLES

FIG. 4
MOVING TABLESPACES THAT CONTAIN BOTH KNOWN-SCHEMA AND UNKNOWN-SCHEMA XML

FIG. 5

EFFICIENT MIGRATION OF BINARY XML ACROSS DATABASES

RELATED APPLICATION

This application is related to U.S. Pat. No. 5,890,167, entitled "PLUGABBLE TABLESPACES FOR DATABASE SYSTEMS", by Bridge, Jr. et al. on May 8, 1997, the entire contents of which is hereby incorporated by reference for all purposes as if fully set forth herein.

FIELD OF THE INVENTION

The present invention relates to computer systems and more particularly to copying a subset of one computer database to another.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Today, much information is digitized and stored in databases that are managed by database systems. Databases can be substantial in size, and it is not uncommon to find databases that can hold more than a few million gigabytes.

Under a variety of circumstances, it may be necessary or useful to move data between databases. There are various ways to move data between databases. For example, one can move all data from an existing database into another simply by making a copy of the existing database. Copying an entire database is reasonably fast, since standard operating system utilities can be used to make an exact, binary copy of all the files in the database.

However, making an exact copy of a database is not so useful for many database-to-database movement needs. For example, when building data warehouses, the source and the target databases are typically not identical. For this reason, database owners prefer to incorporate new information into their existing databases, letting that newly transferred information become a subset of the existing database, and not a separate database.

Moving subsets of data between databases is a slow and complicated process. One cannot simply copy a subset of files from a target database into a source database and expect all the data to be integrated into the source database automatically. The intrinsic complicated internal structure of databases makes it necessary to perform additional integration steps.

Pluggable Tablespaces

One way to quickly move data between databases is to use pluggable tablespaces. In general, a tablespace is a logical portion of a database used to allocate storage for table and index data. Each tablespace corresponds to one or more physical data files. Pluggable tablespaces allow the transport of a set of tablespaces from one database to another.

A "pluggable tablespace set" is a set of tablespaces from a source database that have been selected to be transported/plugged into a target database. In order to transport or plug a tablespace set from a source database to a target database, export and import operations are used.

To move data from one table to another using pluggable tablespaces, an export operation copies the tablespace set from a source database and creates a pluggable tablespace set. When the pluggable tablespace set is created in plug-in format, all the metadata information in the data dictionary of the source database, about all objects in the pluggable tablespace set, is exported in DDL format into an export file. This information includes data about tables, indexes, referential integrity constraints, and space allocation.

The import of pluggable tablespaces involves storing, as part of the target database, the files that correspond to the tablespaces in the pluggable tablespace set. In addition, the metadata for the pluggable tablespace set is reconstructed and inserted into the target database's data dictionary.

Using pluggable tablespaces avTSs that need to patch absolute disk pointers by using tablespace-relative disk pointers. In addition, using pluggable tablespaces integrates metadata by exporting tables in their entirety into a high-level, data description language (DDL) format that does not employ pointers or separate metadata at all.

For an object in the pluggable set, such as a table, part of the exported information includes a tablespace-relative pointer to the location of the object.

An example of how pluggable tablespaces might be implemented is described in U.S. Pat. No. 5,890,167, entitled "PLUGABBLE TABLESPACES FOR DATABASE SYSTEMS".

Binary XML

Binary XML is one format in which XML data can be stored in a database. Binary XML is a compact binary representation of XML that was designed to reduce the size of XML documents. One of the ways binary XML compresses data is by representing strings with fixed values.

In one implementation of binary XML, a mapping is established between character strings and replacement values, where the character strings are tag names, and the replacement values are numbers. Such mappings are referred to herein as "translation information".

For example, consider an XML document POI that contains the following content:

```
<Purchase Order>
    <body>
        Important Data
    </body>
</Purchase Order>
```

PO1 includes the character strings "Purchase Order" and "body". To store PO1 in binary XML format, the token "Purchase Order" may be mapped to 1, and the token "body" may be mapped to 2. Typically, the replacement values consume much less space than the corresponding tokens. For example, the token "Purchase Order", which contains fourteen characters, may be assigned a binary replacement value that takes less space to store than a single text character.

Once translation information has been created, XML documents may be stored in binary XML based on the translation information. For example, PO1 may be stored as <1><2>Important Data</2></1>. In typical implementations of binary XML, even the symbols (e.g. "<", ">", and "/") may be represented by binary replacement values.

Translating Between Binary XML and Text

When stored in binary XML, an XML document consumes much less space than is required by other formats of XML storage. However, the space savings is achieved at the cost of additional overhead required to convert textual XML to binary XML, and to convert binary XML to textual XML. For example, to be meaningful to an application that requests PO1, <1><2>Important Data</2></1> would have to be translated back into:

```
<Purchase Order>
    <body>
        Important Data
    </body>
</Purchase Order>
```

In order to reconstruct the text of an XML document that has been stored in binary format, the translation information that was used to encode the XML document must be available. The translation information that is used to store XML data within a database are typically stored separate from the binary XML data itself. In fact, the translation information used to encode binary XML data is often located in a different tablespace than the tablespace in which binary XML data is stored.

Moving Binary XML Between Databases

Unfortunately, tablespaces that contain binary XML cannot be moved between databases using the pluggable tablespace techniques referred to above. Specifically, once plugged in to another database, the database server that manages the new database would not know how to derive the original XML text from the binary XML contained in the plugged-in tablespace. Consequently, binary XML has to be moved from one database to another by converting the XML data to a text format and putting the XML text into a dump file. The text in the dump file is then parsed by the target database, and inserted into the appropriate tables. This process of parsing and inserting is very memory and CPU intensive. The time taken by the entire process is linearly proportional to the number or rows being imported. Consequently, this process can be very slow. For a large dataset, the current export/import process becomes impractical. In addition, the XML data in the dump file occupies a large amount of additional disk space.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoids unnecessarily obscuring the present invention.

Overview

Techniques are provided for moving tablespaces that contain binary XML from one database to another. According to one embodiment, tablespaces that contain binary XML are moved using both pluggable tablespace techniques and a dump file. Specifically, the binary XML itself is moved by performing a binary copy to plug the tablespace containing the binary XML into the target database. In addition, the metadata required to support and interpret the binary XML (the translation information) is moved from the source database to the target database using a dump file. Because the binary XML is moved using pluggable tablespaces, the movement of the data requires a fixed amount of time irrespective of the size of the data being moved. Further, because the dump file contains only metadata, the dump file size is relatively small, so the extra space overhead is avoided.

Known-Schema XML and Unknown-Schema XML

How database system stores translation information may hinge on whether the translation information is for known-schema XML or for unknown-schema XML. XML data is "known-schema" XML if the database server knows the XML schema to which the XML data conforms. The database server may "know" the schema, for example, if the schema has been registered with the database server.

On the other hand, XML data is "unknown-schema" XML if the database server does not know the schema to which the XML data conforms. Thus, unknown-schema XML includes both (a) XML documents that do not conform to any schema, and (b) XML documents that conform to an XML schema, but the XML schema is not known to the database server.

Inter-Database Tablespace Transfer: Overview

In general, moving a tablespace that contains binary XML from a source database to a target database involves (1) moving the tablespace, and (2) moving the metadata that the target database will need to make use of the data contained in the tablespace. According to one embodiment, the movement of the tablespace is performed using the pluggable tablespace techniques referred to above. The specific metadata that needs to be moved is based on what type of binary XML is contained in the tablespace. Specifically, if the binary XML conforms to a known schema, then entries in the source database schema table are exported from the source database and imported into the target database schema table. On the other hand, if the binary XML does not conform to a schema, then the source database token tables that contain the mapping are copied to the target database.

According to one embodiment, the database server verifies that all the data on which the XML data in the tablespace depends is part of the tablespaces being exported. The dependant data includes the token definitions for binary XML, which reside in a set of token tables, and any out-of-line data for O-R XML tables.

An export process gathers all the schema information that the XML tables in the tablespaces use, and stores the schema information in a dump file external to the source database.

Additionally, Data Definition Language commands (DDLs) for table metadata creation are also placed in the export dump file.

The tablespace files are then copied over to the target database, and the user runs an import command. In response to the import command, the database server recreates the metadata in the target database based on the dump file. The XML data is then ready to be used on the importing side.

Known Schema XML

Translation Information for Known-Schema Binary XML

In some database systems, the translation information for known-schema binary XML is stored on a per-schema basis. Thus, since all documents that conform to a given schema will typically contain the same tag strings, the same translation information is used to encode all of the documents that conform to the given schema.

According to one embodiment, the translation information for known-schema binary XML is stored, in the database, as part of the definition of the schema. Schema definitions, in turn, are stored in a schema table.

The definition of a known-schema need not reside in the same tablespace as the binary XML that schema definition is used to encode. Consequently, affirmative steps are taken to ensure that the appropriate translation information is exported in response to the inter-database movement of pluggable tablespaces that contain binary XML, as shall be described in greater detail hereafter.

Transporting Known-Schema Binary XML

For binary XML data that conforms to a schema, the translation information is stored, along with information that defines the structure of XML documents, in entries in a schema table. Therefore, in order to move a tablespace that contains known-schema binary XML from a source database to a target database, it is necessary to not only move the binary XML data, but also to update the target database schema table, i.e. copy the appropriate entries from the source database schema table to the target database schema table.

Updating the schema table of the target database includes storing a schema-specific mapping in the target database for the XML data in the transported tablespace that conforms to the schema. According to one embodiment, the entire schema table of the source database is not copied to the target database. Rather, only the schema table entries of the source database that are necessary to decode the transported binary XML are exported. After exporting the appropriate entries from the schema table of the source database, the entries are then inserted into the schema table of the target database.

It is possible that the schema table of the target database already has entries for the newly-imported schema. If so, a comparison operation is performed between the schema definition that is being imported, and the schema definition that is already present in the target database. If the schema definitions are identical, then the schema definitions may be used for both the existing and the newly-imported binary XML that conforms to that schema. If the schema definitions are not identical, then additional steps may be required to complete the import operation. For example, it may be necessary to migrate the existing binary XML data associated with the schema to cause it to conform to the newly imported schema definition.

Example: Transporting Known-Schema Binary XML

Figure 1:
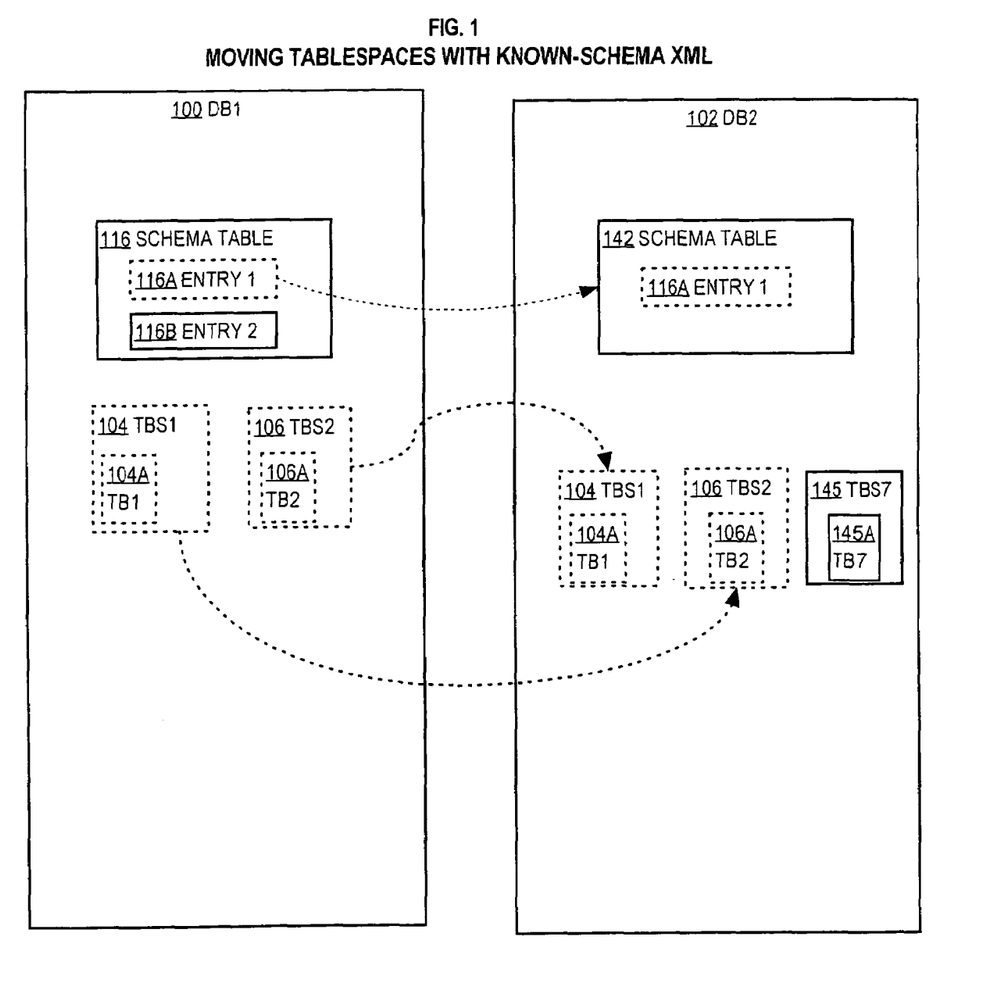
FIG. 1 shows a block diagram illustrating the process of moving tablespaces that conform to a schema from source database to target database.

FIG. 1 is a block diagram illustrating the process of moving tablespaces that contain known-schema XML from a source database to a target database. Referring to FIG. 1, a source database DB1 100 has a system mapping table 112, a set of token tables 114, a schema table 116, and the two tablespaces TBS1 104 and TBS2 106 that are to be moved to target database DB2 102.

Tablespaces TBS1 104 and TBS2 106 containing tables TB1 104A and TB2 106A, respectively. Database DB1 100 has a schema table 116 with two entries, ENTRY 1 116A and ENTRY 2 116B. Schema ENTRY 1 116A contains the translation information needed to derive the binary XML contained in tablespaces TBS1 104 and TBS2 106. The transport operation involves moving tablespaces TBS1 104, TBS2 106, and schema entry 116A, to database DB2 102.

Database DB2 102 has a schema table 142 and a tablespace TBS7 145 containing a table TB7 145A. When tablespaces TBS1 104 and TBS2 106 of source database DB1 100 are transferred (using a binary copy of the files that contain the tablespaces), the schema table 142 of database DB2 102 is also populated with schema table ENTRY 1 116A.

Unknown Schema XML

Translation Information for Unknown-Schema Binary XML

In some database systems, the translation information for all unknown-schema binary XML are stored in tables referred to herein as "token tables". In one embodiment, three token tables are used to store the translation information for unknown-schema XML: a Qname token table, a namespace token table, and a path_id token table. The three token tables are collectively referred to as a "token table set".

The Qname token table for an XML schema contains the Qname-to-replacement-value mappings used to encode the Qnames contained in unknown-schema XML. The namespace token table for an XML schema contains the namespace-to-replacement-value mappings used to encode the namespaces contained in unknown-schema XML. The path_id token table for an XML schema contains the path_id-to-replacement-value mappings used to encode the path_ids contained in unknown-schema XML.

Initially, a database will have a single "local" token table set. Before any tablespaces have been transferred to a database from other databases, the local token table set of a database contains the translation information for all unknown-schema binary XML in the database. However, when pluggable tablespaces that contain unknown-schema binary XML are plugged into the database, additional token table sets may be added to the database. Token table sets that are added to the database as a result of the plugging-in of a tablespace are referred to herein as "imported" token table sets.

The token table sets need not reside in the same tablespace as the binary XML that the token table sets are used to encode. For example, in one embodiment, the default location for the token table sets is an "XDB" tablespace specifically designated to store XDB schema objects. Consequently, affirmative steps are taken to ensure that the appropriate token table sets are exported in response to the inter-database movement of pluggable tablespaces that contain unknown-schema binary XML, as shall be described in greater detail hereafter.

Transporting Unknown-Schema Binary XML Data

As mentioned above, the translation information for binary XML data that does not conform to a known schema is stored in a token table set. In one embodiment, each token table set includes:

Q_Name token table;
Name_Space token table; and
Path_ID token table.

According to one embodiment, transporting a tablespace with unknown-schema binary XML from a target database to a source database includes transporting the complete set of token tables associated with the unknown-schema binary XML from the source database to the target database. In some implementations, those token tables may include entries for decoding binary XML that resides in tablespaces other than the tablespace that is actually being moved. Consequently, there might be a number of entries in the transported set of token tables that are not useful or meaningful to the target database.

As mentioned above, each database initially starts with a single "local" token table set. However, every time a token table set of is moved to a target database as part of the transfer of a pluggable tablespace that has unknown-schema XML, an additional token table set is added to the target database. After importing unknown-schema XML from many different databases, a single target database may have several distinct token table sets. Because a single database may have several distinct token table sets, the database server must select the appropriate token table set for any given binary XML translation operation.

According to one embodiment, the database server is able to select and use the appropriate token table sets by (1) assigning a globally-unique identifier (GUI) to each token table set, and (2) maintaining a mapping between the GUIs and tablespace identifiers (TSIDs). The TSID-to-GUI mapping associates the GUI of each token table set with the TSID of each tablespace that contains binary XML that has been encoded using the translation information contained in that token table set.

Avoiding Token Table Name Collision

If both the source and the target database have token tables called Q_Name, then transporting the source database Q_Name token table to the target database would create a name conflict, because the target database already has a token table called Q_Name. In order to avoids this problem, the global unique identifier (GUI) associated with each token table set is appended to the name of the token tables in the token table set, so that the token table names have the form Q_Name_GUI.

By appending the GUI to the token table names in this manner, collision between token tables that have the same name, but that belong to different token table sets, is avoided. As a result, when transporting tablespaces and their respective set of token tables from a source database to a target database, the names of the newly imported token tables do not collide with the token tables that already exist in the source database.

TSID-to-GUI Mapping

As mentioned above, the database server is able to select and use the appropriate token table sets based on a mapping between the GUIs and tablespace identifiers (TSIDs). According to one embodiment, the TSID-to-GUI mapping is stored in a mapping table. Such a mapping table may contain, for example, an entry for each tablespace, within the database, that contains binary XML. The mapping table entry for a tablespace indicates the GUI of the token table set that should be used to encode/decode the binary XML data contained in the tablespace.

When a tablespace that contains binary XML is moved from a source database to a target database, the mapping table within the target database must be updated to include an entry for the tablespace. The new entry establishes a mapping between the newly imported tablespace and the newly imported token table set. Consequently, when a database server receives a request for XML data that is stored in binary XML format, the database server (a) determines the TSID of the tablespace that contains the desired XML data, (b) uses the mapping table to identify the GUI that corresponds to that TSID, and (c) decodes the unknown-schema binary XML using the token tables that belong to the token table set associated with that GUI.

Example: Transporting Unknown-Schema Binary XML

Figure 2:
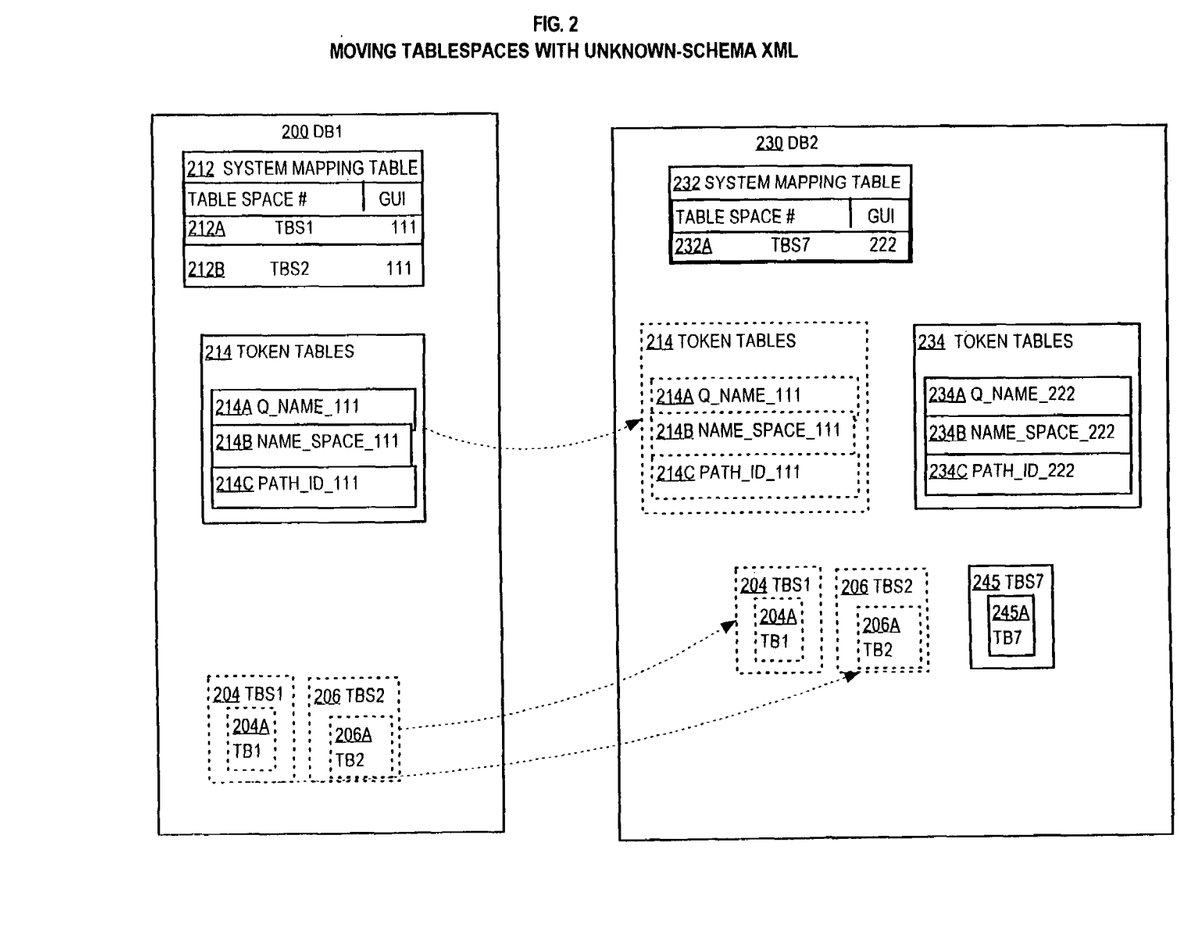
FIG. 2 shows a block diagram illustrating the process of moving tablespaces that do not conform to a schema from source database to target database.

FIG. 2 is a block diagram illustrating the moving of tablespaces that contain unknown-schema binary XML from a source database to a target database. Referring to FIG. 2, a database DB1 200 has a system mapping table 212, a set of token tables 214, and tablespaces TBS1 204 and TBS2 206 to be transported to database DB2 230. Tablespaces TBS1 204 and TBS2 206 contain tables TB1 204A and TB2 206A, respectively.

System mapping table 212 of database DB1 200 stores a mapping list of tablespaces and GUIs. The system mapping table 212 indicates to a database server which set of token tables to use for each tablespace by mapping each tablespace to a GUI. For example, the system mapping table 212 shows entries 212A and 212B that map tablespace TBS1 204 and tablespace TBS2 206 to GUI 111. Consequently, the token tables 214 associated with GUI 111 need to be used when translating unknown-schema XML that resides in tablespaces TBS1 204 and TBS2 206. There are three token tables in database DB1 200: Q_Name_111 214A, Name_Space_111 214B, and Path_ID_111 214C.

The process of moving the unknown-schema binary XML from tables 204 and 206 to database 230 includes (1) using a binary copy to move tablespaces TBS1 204, TBS2 206, and (2) importing token tables 214 into database DB2 230.

As illustrated in FIG. 2, database DB2 230 has its own system mapping table 232, its own set of token tables 234 and a tablespace TBS7 245. System mapping table 232 of database DB2 230, keeps a mapping list of tablespaces and GUIs. The system mapping table 232 lets database servers that access database DB2 230 know which set of token tables to use for each tablespace in database DB2 230 by mapping each tablespace with a GUI. For example the system mapping table 232 shows entry 232A that maps tablespace TBS7 245 with GUI 222. In this way, a database server would know to use token tables 234 with GUI 222 when retrieving data in tablespace TBS7 245.

There are three token tables in database DB2 230: Q_Name_222 234A, Name_Space_222 234B, and Path_ID_222 234C. When tablespaces TBS1 204 and TBS2 206 of source database DB1 200 are transferred, the token tables 214 of database DB1 200 will also be transferred to database DB2 230. After the transfer has been completed, database DB2 230 will have two set of token tables, token tables 214 with GUI 111 and token tables 234 with GUI 222.

Figure 3:
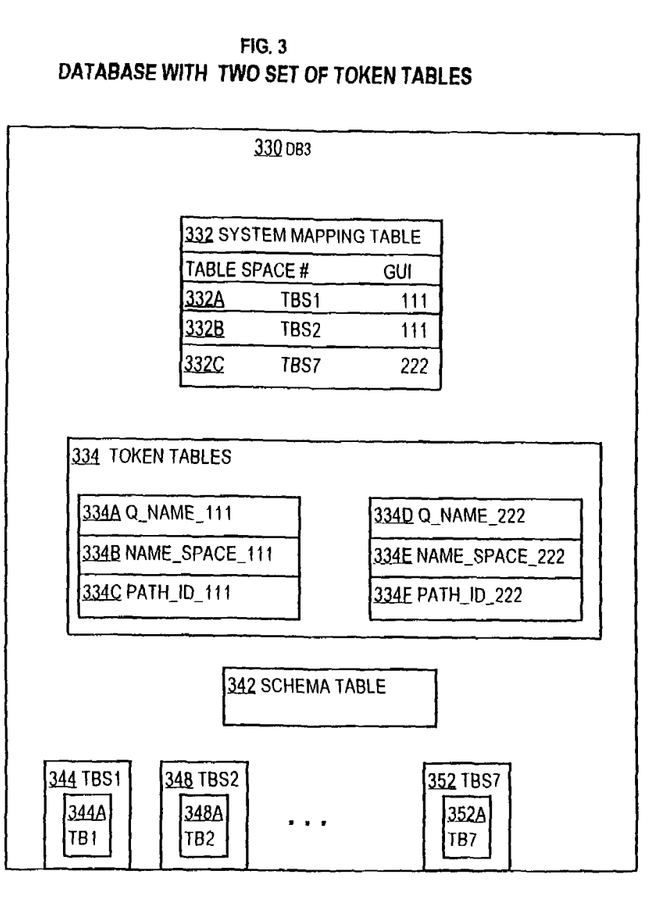
FIG. 3 shows an example of a database with two sets of token tables.

FIG. 3 shows an example of a database DB3 330 with a set of two token tables. Referring to FIG. 3 database DB3 330 has a system mapping table 342, two set of token tables 334, a schema table 342, and tablespaces TBS1 344, TBS2 348, and TBS7 352.

Tablespaces TBS1 344 and TBS2 348 use the token tables associated with GUI 111, as specified in entries 332A and 332B of the system mapping table 332. Those token tables include: Q_Name_111 334A, Name_Space_111 334B, and Path_ID_111 334C.

Tablespace TBS7 352 uses the token tables associated with GUI 222, as specified in entry 332C of the system mapping table 332. Those token tables include: Q_Name_222 334D, Name_Space_222 334E, and Path_ID_222 334F.

Example: Transporting a Tablespace with Both Known-Schema and Unknown-Schema Binary XML Data It is possible for a single tablespace to include both known-schema binary XML, and unknown-schema binary XML. For example, in some database systems, users may be allowed to specify that some portions of an XML document conform to a schema, and that other portions do not. Under these circumstances, the translation metadata that is moved from the source database to the target database includes both the metadata for translating the known-schema binary XML (e.g. the schema definition information), and the metadata for translating the unknown-schema binary XML (e.g. the token table set).

Figure 4:
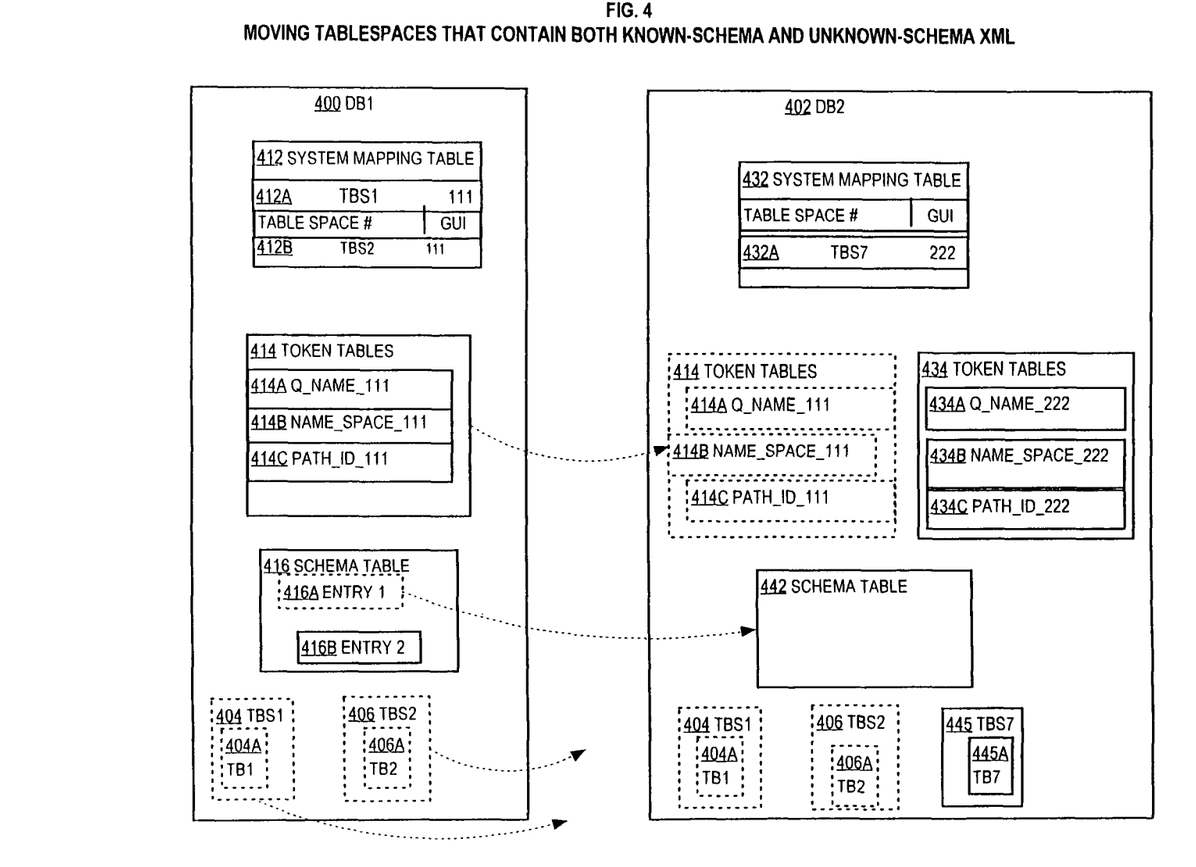
FIG. 4 shows a block diagram illustrating the process of moving a tablespace that conforms to a schema and a tablespace that does not conform to a schema, from source database to target database.

FIG. 4 shows a block diagram illustrating the moving of tablespaces from source database DB1 400 to target database DB2 402. For the purpose of illustration, it shall be assumed that tablespace TBS1 404 includes both known-schema and unknown-schema binary XML.

Database DB1 400 has a system mapping table 412, a set of token tables 414, a schema table 416, and tablespaces TBS1 404 and TBS2 406 that we would like to transport to database DB2 402. System mapping table 412 of database DB1 400, keeps a mapping list of tablespaces and GUIs. The system mapping table 412 lets the database servers that access database DB1 400 know which set of token tables to use for each tablespace by mapping each tablespace with a GUI. For example, the system mapping table 412 shows entries 412A and 412B that map tablespace TBS1 404 and tablespace TBS2 406 with GUI 111. In this way, a database server that is managing database DB1 400 knows to use token tables 414 with GUI 111 when retrieving data in tablespaces TBS1 404 and TBS2 406.

There are three token tables in database DB1 400:
Q_Name_111 414A;
Name_Space_111 414B; and
Path_ID_111 414C.

Database DB1 400 has two tablespaces, TBS1 404 and TBS2 406, containing tables TB1 404A and TB2 406A respectively. Database DB1 400 has a schema table 416 with two entries, ENTRY 1 416A and ENTRY 2 416B. Schema ENTRY 1 416A contains the mapping information needed to derive the binary XML contained in tablespace TBS1 404. The XML data in tablespace TBS2 406 relies on a set of token tables 414 which are uniquely identified across databases because they contain the GUI in their names.

For the purpose of illustration, assume that tables TB1 404A and TB2 406A are to be transported to database DB2 402 using transportable tablespace mode. According to one embodiment, a user would issue a "transport_set_check" command to cause the database server verify that the token tables 414 are also included for export along with TBS1 404 and TBS2 406. Once this has been verified, metadata information, such as XML schemas (in this case schema table 416 entry 416A of database DB1 400) and create table DDLs will be written to the dump file.

The tablespaces TBS1 404, TBS2 406, token tables 414, and schema table 416 entry 1 416A of database DB1 400 are copied over to the importing database DB2 402 using OS copy or FTP or any other binary file copy mechanisms. The user then runs an import utility which recreates the DDLs based on the information in the dump file. The import utility also associates the tablespaces TBS1 404, TBS2 406, and token tables 414 with database DB2 402, so that tables TB1 404A and TB2 406B will be ready to use in the importing database DB2 402.

Database DB2 402 has its own system mapping table 432, its own set of token tables 434, a schema table 442, and a tablespace TBS7 445 containing table TB7 445A. System mapping table 432 of database DB2 402, keeps a mapping list of tablespaces and GUIs. The system mapping table 432 lets database servers that manage database DB2 402 know which set of token tables to use for each tablespace by mapping each tablespace with a GUI. For example the system mapping table 432 shows entry 432A that maps tablespace TBS7 445 with GUI 222. In this way, database DB2 402 knows to use token tables 434 with GUI 222 when retrieving data in tablespace TBS7 445.

There are three token tables in database DB2 402: Q_Name_222 434A, Name_Space_222 434B, and Path_ID_222 434C. When tablespaces TBS1 404 and TBS2 406 of source database DB1 400 are transferred, the token tables 414 of database DB1 400 and the schema table 416 entry 1 416A of database DB1 400 are also transferred to database DB2 402.

After the transfer has been completed, database DB2 402 has two set of token tables, token tables 414 with GUI 111 and token tables 434 with GUI 222. The schema table 442 of database DB2 402 will be populated with schema table 416 entry 1 416A.

The system mapping table 432 on the importing side, DB2 402, will be updated to indicate that tablespaces TBS1 404 and TBS2 406 should use token tables 414 with GUI 111, i.e. the GUI that was associated with the token tables 414.

Whenever the user queries the tables TB1 404A or TB2 406A, the token manager in database DB2 402 will consult the system mapping table 432, get the appropriate token tables 414 and decode the tokens in the binary XML that tables TB1 404A and TB2 406A hold. In this way, we can use the tokens in tables TB1 404A and TB2 404B on the importing side without remapping the tokens.

Hardware Overview

Figure 5:
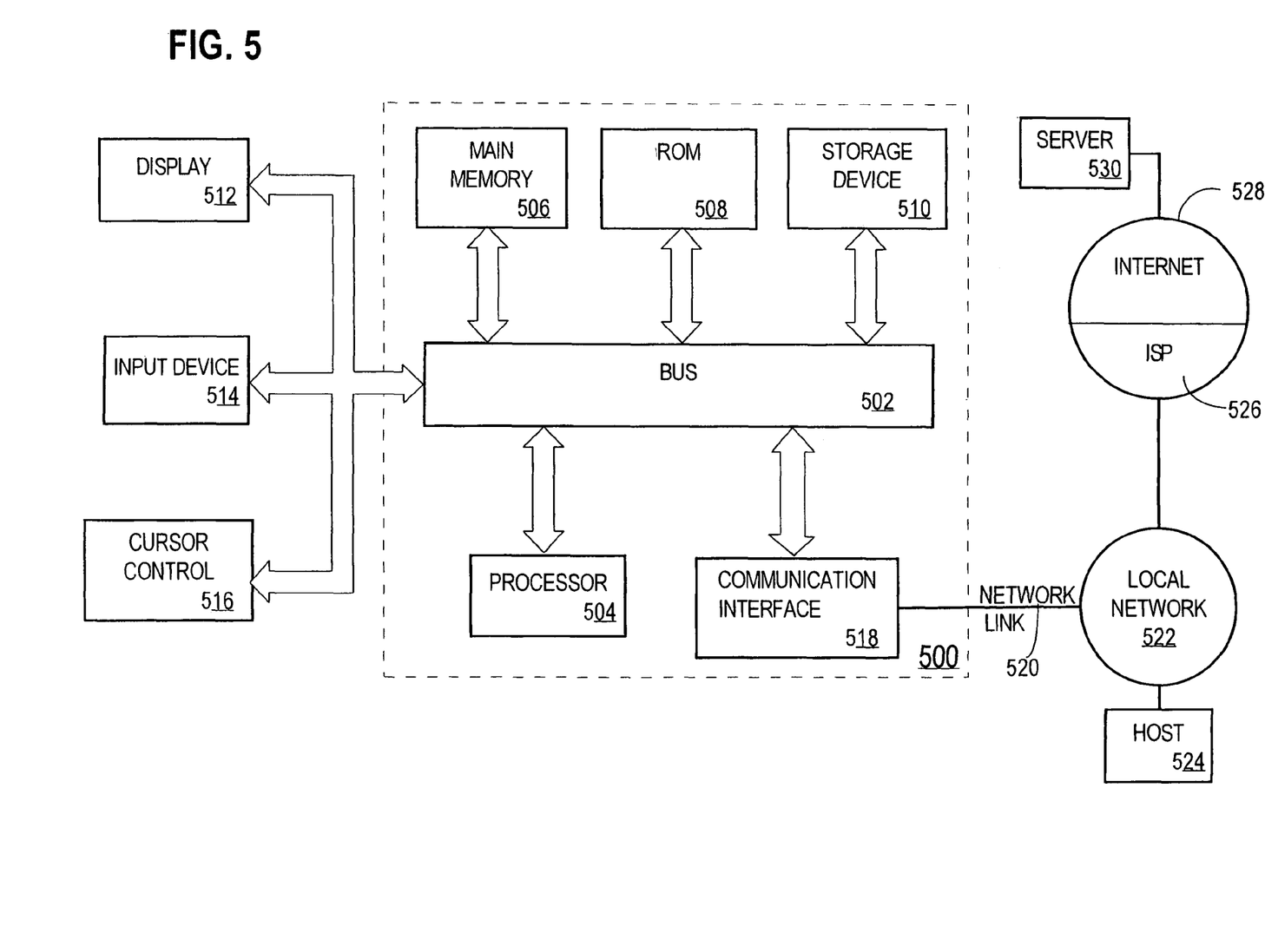
FIG. 5 is a block diagram that illustrates a computer system upon which an embodiment of the invention may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for detecting unwanted electronic mail messages based on probabilistic analysis of referenced resources. According to one embodiment of the invention, detecting unwanted electronic mail messages based on probabilistic analysis of referenced resources is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 406 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from-computer system 500, are exemplary forms of carrier waves transporting the information.

Computer system 500 can send messages and receive data, including program code, through the network(s), network link 520 and communication interface 418. In the Internet example, a server 530 might transmit a requested code for an application program through Internet 528, ISP 526, local network 522 and communication interface 518. In accordance with the invention, one such downloaded application provides for detecting unwanted electronic mail messages based on probabilistic analysis of referenced resources as described herein.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer implemented method for moving XML data from a source database to a target database, comprising:
   generating a copy of a particular tablespace that is part of the source database,
      wherein the particular tablespace contains first binary XML data;
      wherein the first binary XML data is XML data that has been encoded in a binary format,
      wherein the copy of the particular tablespace contains second binary XML data;
      wherein the second binary XML data is a copy of the first binary XML data;
   incorporating the copy of the particular tablespace into the target database,
      wherein incorporating the copy of the particular tablespace into the target database causes the second binary XML data to be incorporated in the target database;
   determining translation information, that is used for decoding the first binary XML data in the source database, and that is needed to decode the second binary XML data in the target database; and
   generating a copy of the translation information from said source database;
   incorporating the copy of the translation information into the target database;
   after incorporating the copy of the particular tablespace and the copy of the translation information into the target database, using the copy of the translation information to decode the second binary XML data when the second binary XML data is accessed in the target database;
   wherein generating the copy of the translation information includes generating a copy of a set of token tables that contain the translation information necessary to decode the second binary XML data;
   wherein incorporating the copy of the translation information into the target database includes updating metadata within the target database to indicate that the copy of the set of token tables are associated with said copy of the particular tablespace; and
   wherein the steps of generating a copy of the particular tablespace, incorporating the copy of the particular tablespace, generating a copy of the translation information, incorporating the copy of the translation information, and using the copy of the translation information are performed by one or more computing devices.

2. The method of claim 1, wherein:
   the XML data that resides in said particular tablespace includes unknown-schema XML data.

3. The method of claim 1 wherein:
   within the source database, the set of token tables is associated with a particular identifier that is also mapped to said copy of said particular tablespace;
   the method further includes associating, within the target database, the copy of the set of token tables with said particular identifier; and
   the particular identifier is unique relative to both the target database and the source database;
   wherein said copy of said particular tablespace includes multiple XML nodes.

4. The method of claim 3, further comprising:
   appending the particular identifier to a name of at least one token table in the copy of the set of token tables to ensure that the name of the at least one token table is unique within said target database.

5. The method of claim 1, further comprising:
   computing a query using the incorporated copy of the translation information.

6. A non-transitory computer-readable storage medium storing one or more sequences of instructions for moving XML data from a source database to a target database which, when executed by one or more processors, causes the one or more processors to perform:
   generating a copy of a particular tablespace that is part of the source database,
      wherein the particular tablespace contains XML data that has been encoded in a binary format;
   incorporating the copy of the particular tablespace into the target database;
   determining translation information, that is used for decoding XML data in the source database, and that is needed to decode the XML data in the particular tablespace; and
   generating a copy of the translation information from said source database;
   incorporating the copy of the translation information into the target database;
   after incorporating the copy of the particular tablespace and the copy of the translation information into the target database, using the copy of the translation information to decode the XML data that is encoded in the binary format, that resides in the copy of the particular database;
   wherein generating the copy of the translation information includes generating a copy of a set of token tables that contain the translation information necessary to decode the second binary XML data;
   wherein incorporating the copy of the translation information into the target database includes updating metadata within the target database to indicate that the copy of the set of token tables are associated with said copy of the particular tablespace.

7. The non-transitory computer-readable storage medium of claim 6, wherein:
   the XML data that resides in said particular tablespace includes unknown-schema XML data.

8. The non-transitory computer-readable storage medium of claim 6, wherein: within the source database, the set of token tables is associated with a particular identifier that is also mapped to said copy of said particular tablespace;
   the one or more sequences of instructions, when executed by the one or more processors, further cause the one or more processors to perform associating, within the target database, the copy of the set of token tables with said particular identifier; and
   the particular identifier is unique relative to both the target database and the source database;
   wherein said copy of said particular tablespace includes multiple XML nodes.

9. The non-transitory computer-readable storage medium of claim 8, wherein the one or more sequences of instructions, when executed by the one or more processors, further cause the one or more processors to perform:

appending the particular identifier to a name of at least one token table in the copy of the set of token tables to ensure that the name of the at least one token table is unique within said target database.

10. The non-transitory computer-readable storage medium of claim 6, wherein the one or more sequences of instructions, when executed by the one or more processors, further cause the one or more processors to perform:

computing a query using the incorporated copy of the translation information.

* * * * *

UNITED STATES PATENT AND TRADEMARK OFFICE
CERTIFICATE OF CORRECTION

| | | |
|---|---|---|
| PATENT NO. | : 8,909,599 B2 | Page 1 of 1 |
| APPLICATION NO. | : 11/601116 | |
| DATED | : December 9, 2014 | |
| INVENTOR(S) | : Khaladkar et al. | |

It is certified that error appears in the above-identified patent and that said Letters Patent is hereby corrected as shown below:

Title Page

On first page, column 2, item (74) under Attorney, Agent, or Firm, delete "Troung Becker et all" and insert -- Truong Becker Bingham Wong --, therefor.

On page 3, column 1, item (56) under Other Publications, line 30, delete "msdn2" and insert -- msdn --, therefor.

On page 3, column 1, item (56) under Other Publications, line 31, delete "sq1" and insert -- sql --, therefor.

On page 3, column 2, item (56) under Other Publications, line 2, delete "http://.hpl.hp.com" and insert -- http://www.hpl.hp.com --, therefor.

On page 3, column 2, item (56) under Other Publications, lines 11-12, delete "Oracle9iJ Developer" and insert -- Oracle9i JDeveloper --, therefor.

In the Specification

In column 1, line 7, delete ""PLUGABBLE" and insert -- "PLUGGABLE --, therefor.

In column 2, line 24, delete ""PLUGABBLE" and insert -- "PLUGGABLE --, therefor.

In column 2, line 38, delete "POI" and insert -- PO1 --, therefor.

Signed and Sealed this
Fourth Day of August, 2015

Michelle K. Lee
*Director of the United States Patent and Trademark Office*